UNITED STATES PATENT OFFICE.

RALPH W. KING, OF THE DALLES, OREGON, ASSIGNOR TO PACIFIC EVAPORATOR COMPANY, OF PORTLAND, OREGON, A CORPORATION OF OREGON.

METHOD OF PREPARING EVAPORATED FRUIT.

1,259,633.          Specification of Letters Patent.      Patented Mar. 19, 1918.

No Drawing.      Application filed June 27, 1916. Serial No. 106,149.

*To all whom it may concern:*

Be it known that I, RALPH W. KING, a citizen of the United States, residing at The Dalles, in the county of Wasco and State of Oregon, have invented new and useful Improvements in Methods of Preparing Evaporated Fruit, of which the following is a specification.

This invention relates to a method of preparing evaporated fruit and consists in certain improvements therein as will be hereinafter fully described and pointed out in the claims.

The invention in its more restricted phases is particularly adapted to the evaporation of fruit of the prunus family, especially peaches and apricots, although other fruit such as pears may be similarly treated. In preserving the natural flavor and color of such fruit great care must be taken not to break down the fruit cells and at the same time to prevent discoloration through the constituents of the fruit.

In carrying out my process, especially more particularly where it is carried out with peaches and apricots, the fruit is peeled, sliced and subjected to a bleaching agent, such as sulfur fumes. This is comparatively short and varies slightly with different fruits.

After the fruit has been subjected to the bleaching agent it is subjected to the action of steam. This is ordinarily accomplished by placing the fruit on evaporating trays and putting the trays into a receptacle to which steam is introduced. The steam introduced is a dry steam but is not sufficiently confined or carried for a sufficient length of time to break down the cells of the fruit, or in other words, start the cooking action. The steaming process extends from five to ten minutes.

After the fruit is steamed it is evaporated by passing a current of air through the fruit. The air is kept at a temperature between 125° and 156° Fahrenheit, preferably about 150°. In this way the breaking down of the cell structure of the fruit is obviated and molding, re-absorption or fermentation prevented. Fruit prepared in this way when again supplied with moisture resumes very closely its natural quality and color.

What I claim as new is:—

1. The method of preparing evaporated fruit which consists in subjecting the same to a bleaching agent and steam and evaporating the fruit so treated.

2. The method of preparing evaporated fruit which consist in subjecting the same to a bleaching agent and steam and evaporating the fruit so treated while maintaining the same below a temperature sufficient to break down the cells of the fruit.

3. The method of preparing evaporated fruit which consists in subjecting the same to a bleaching agent and steam, maintaining the fruit during this action at a temperature insufficient to break down the cells of the fruit and evaporating the fruit so treated.

4. The method of preparing evaporated fruit of the prunus family which consists in subjecting the same to a bleaching agent and steam, and evaporating the fruit so treated.

5. The method of preparing evaporated fruit of the prunus family which consists in subjecting the same to a bleaching agent and steam, and evaporating the fruit so treated while maintaining the fruit at a temperature insufficient to break down the cells of the fruit.

In testimony whereof I have hereunto set my hand.

RALPH W. KING.